W. B. SMITH.
MOTOR CRANKING DEVICE.
APPLICATION FILED FEB. 13, 1919.
1,375,940.
Patented Apr. 26, 1921.
2 SHEETS—SHEET 1.
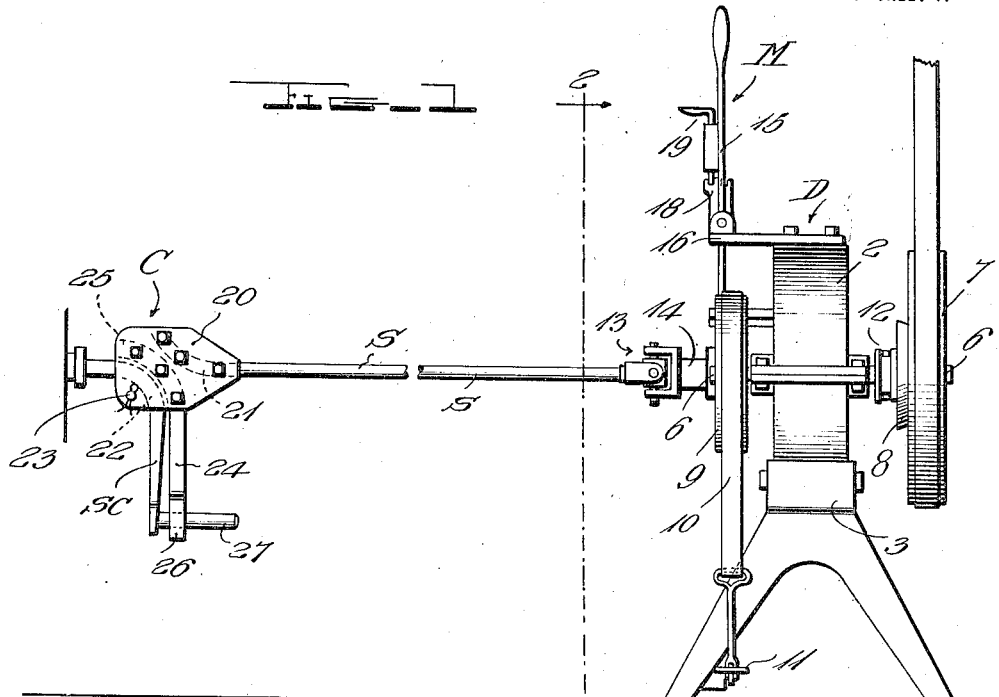
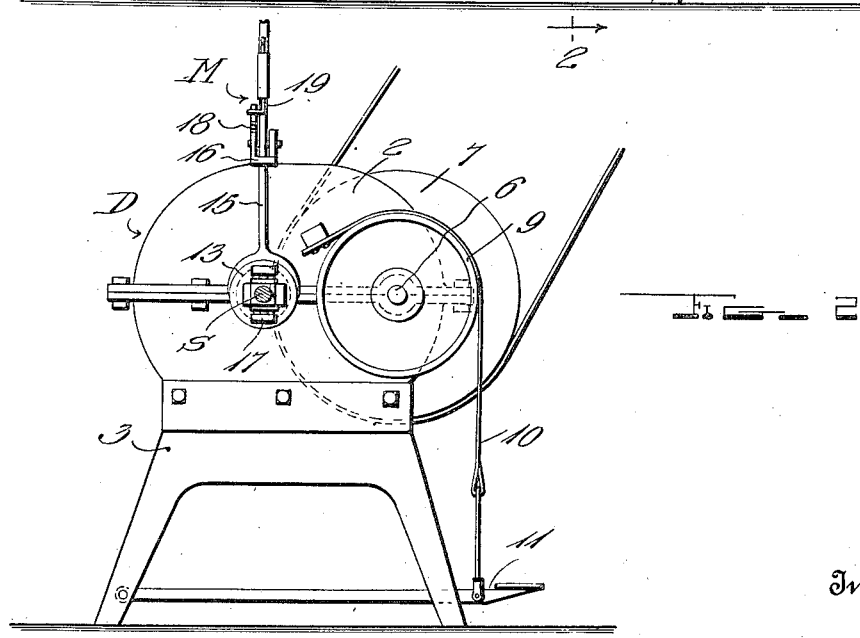
Inventor
Walter B. Smith
By H. B. Willson & Co.
Attorneys
Witness W. B. SMITH.
MOTOR CRANKING DEVICE.
APPLICATION FILED FEB. 13, 1919.
1,375,940.
Patented Apr. 26, 1921.
2 SHEETS—SHEET 2.
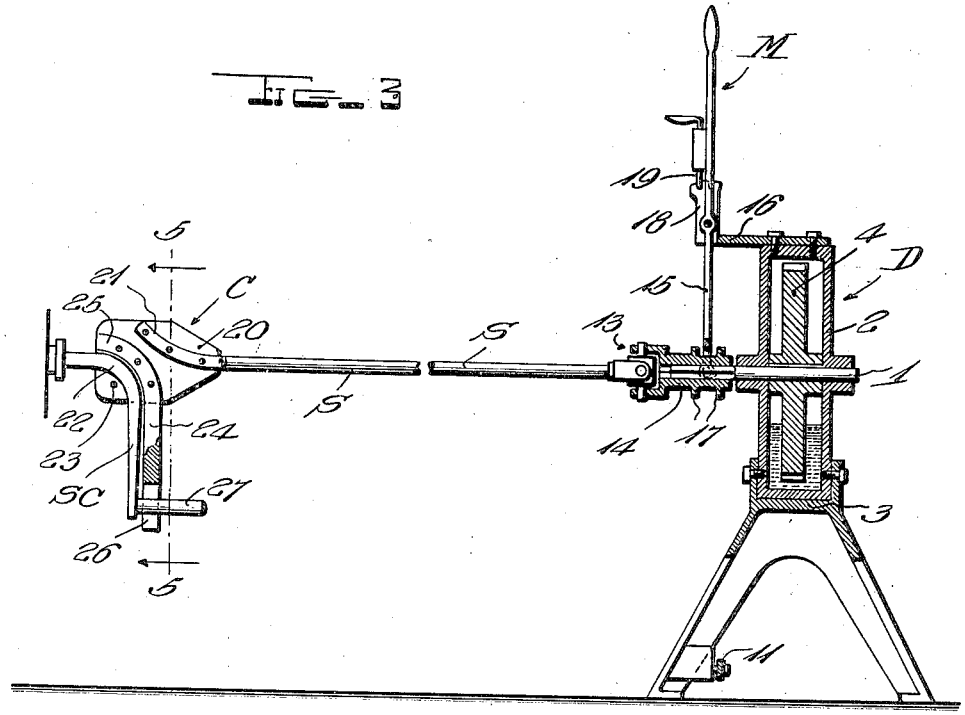
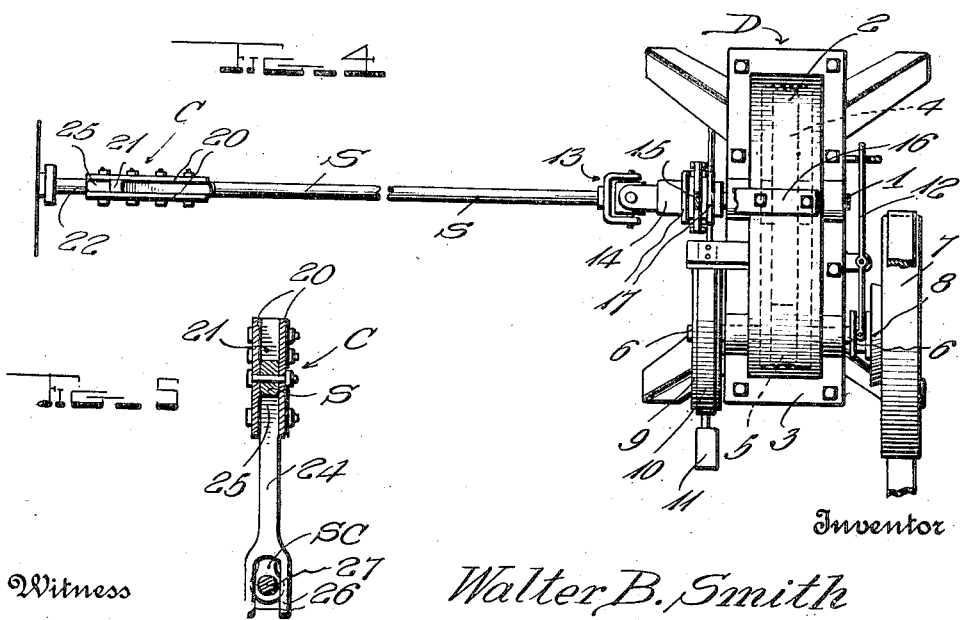
Witness
Inventor
Walter B. Smith
By H. B. Willson & Co.
Attorneys

UNITED STATES PATENT OFFICE.

WALTER BERTON SMITH, OF SIOUX CITY, IOWA, ASSIGNOR TO SMITH-FOOTE CO., OF SIOUX CITY, IOWA, A CORPORATION.

MOTOR-CRANKING DEVICE.

1,375,940.  Specification of Letters Patent.  Patented Apr. 26, 1921.

Application filed February 13, 1919. Serial No. 276,825.

*To all whom it may concern:*

Be it known that I, WALTER BERTON SMITH, a citizen of the United States, residing at Sioux City, in the county of Woodbury and State of Iowa, have invented certain new and useful Improvements in Motor-Cranking Devices; and I do declare the following to be a full, clear, and exact description of the invention, such as will enable others skilled in the art to which it appertains to make and use the same.

In the repair of automobile motors, it is often necessary to insert new connecting rod and main bearing bushings, or to "set up" the old bearings sufficiently to compensate for wear; and after such replacements or adjustments, the motor is often so "stiff" that it cannot be cranked by hand. Heretofore, after numerous workmen have attempted to crank the machine and have thus lost time from other work, it has been necessary to tow the car until the motor starts under its own power and "limbers up" or burnishes its bearings by the rotation of the crank shaft, cranks, etc., therein. This operation not only requires the time of two operators, but is injurious to both machines, often causing a broken crank shaft, main drive shaft, differential, transmission gear, etc., and almost invariably causing slippage and wear of the clutch, transmission bands, etc.

It is the principal object of my invention to overcome the difficulties above enumerated by the provision of a motor cranking or spinning machine which is preferably constructed as herein described, and as shown in the accompanying drawings.

In carrying out the above end, further objects are to provide a cranking machine entirely separate from and relatively fixed with respect to the automobile; to provide for the quick and easy coupling of the power-driven, cranking shaft to the starting crank of the machine; and to make provision for shifting said cranking shaft in a manner to engage the crank operatively with the crank shaft of the motor. One manner of carrying these several objects into effect is disclosed, although other constructions could well be used within the scope of the invention as claimed.

Figure 1 is a side elevation of the machine showing the manner in which it is connected with the automobile starting crank.

Fig. 2 is a vertical transverse section on the plane designated by the line 2—2 of Fig. 1.

Fig. 3 is a vertical longitudinal section.

Fig. 4 is a top plan view.

Fig. 5 is a detail transverse section on the plane of the line 5—5 of Fig. 3.

Briefly speaking, the invention consists of a cranking shaft S, means D for driving said shaft by power, means C for coupling the shaft operatively to the starting crank SC of the automobile motor, and means M for moving the shaft S in a manner to shift the crank SC rearwardly into operative engagement with the usual crank shaft of the motor, all of the parts S, D, C and M, being entirely separate from and relatively stationary with respect to the automobile and being thus distinguished from the several types of self-starters which are carried by the machine and do not possess sufficient power to turn the crank shaft when the bearings are sufficiently tight to prevent cranking of the machine by hand.

The driving means D includes a drive shaft 1 rotatably mounted on a suitable support which is here shown in the form of a gear case 2 supported by a fixed base 3, although it could well be portably mounted if desired. Keyed or otherwise secured on the drive shaft 1 and operating in an oil bath within the casing 2, is a spur gear 4 which meshes with a drive pinion 5 on a jack shaft 6 likewise passing through the casing 2. A belt pulley or the like 7 and preferably a cone clutch 8 are mounted on one end of the shaft 6 for driving the same at will, and a brake drum 9 is carried by the other end of said shaft for coaction with a brake band 10 operable by means of a foot lever or the like 11. Proper control of the clutch 8 by a hand lever 12 or other suitable means, will allow the shaft 1 to be gradually started, this being essential in order that the cranking shaft S shall not be turned with a jerk, which might cause injury either to the cranking machine or to the automobile.

By means of a suitable universal joint 13, the shafts 1 and S are connected for rotation in unison, the hub 14 of said universal joint being slidable upon the shaft 1 to permit the shaft S to be shifted by the means M, so that the starting crank SC may be operatively engaged with the crank shaft of the motor. The means M might well assume any desirable form, but by preference it consists of a lever 15 fulcrumed between its ends on an arm 16 extending laterally from the gear case 2, the lower end of said lever being forked and operating between flanges 17 on hub 14. A suitable segment 18 and pawl 19, or any other adequate means, may be employed for holding the lever and consequently the shaft S in either position.

The coupling means C, is shown as including a pair of flat plates 20 secured to opposite sides of the squared and laterally curved free end 21 of the shaft S, said plates thus forming a socket to receive the angle 22 of the starting crank SC, a pin or the like 23 being provided to prevent withdrawal of said socket until required. A bar 24 has one of its ends 25 secured between the plates 20 and curved for contact with the angle 22 of the crank, this curved end of the bar and the pin 23 serving to prevent relative movement of the crank and coupling means C in any direction, until said pin is removed, whereupon the cranking machine is easily disconnected entirely from the automobile. The bar 24 extends laterally from the plates 20 and is adapted to engage any appropriate off-center part of the crank SC, for which purpose it is preferably forked at 26; and the fork is shown straddling the handle 27 although it might well engage another part of the crank.

By curving the end of the shaft S laterally and securing it between the plates 20, there is no danger of the latter being wrenched from the former and by the provision of the arm 24, any tendency of the crank to spread the plates is prevented.

In operation, the automobile to be cranked is moved into substantial alinement with the shaft 1, the coupling means C is attached to the crank SC by simply straddling the latter with the plates 20 and inserting the pin 23, the lever 15 is then operated to shift the crank into the usual operative engagement with the crank shaft of the motor, and the clutch 8 is carefully thrown in, with the result that the driving means D slowly rotates the shaft S to overcome the friction in the motor bearings, thus turning the crank shaft and cranking the motor. When the clutch is thrown entirely in, the motor may be driven at any requisite speed and the brake mechanism 9—10—11, may be employed to place any required load upon the motor if desired when it is running under its own power, or to quickly bring both motor and cranking machine to a standstill after first throwing the clutch out.

By the use of the invention, "stiff" motors may be cranked with ease and without the loss of time usually occasioned, and it will be seen that the bearings may be properly burnished by rotating the shafts and other parts therein, before the motor is allowed to run under its own power. As above suggested, the entire machine might be made portable to permit it to be readily moved from one place to another in the shop, so that the necessity of moving the cars to the device will be eliminated, but unless the shop is electrically equipped, a fixed base such as that indicated at 3, is preferably employed.

From the foregoing, taken in connection with the accompanying drawings, it will be seen that I have provided a power cranking device which is quickly and easily applicable to and detachable from any number of machines, that the device is simple and efficient in all respects, and that great saving in numerous ways will result from its use. Since probably the best results are obtained from the details disclosed, they may well be followed, but within the scope of the invention as claimed, numerous changes may well be made.

I claim:

1. In a motor-spinning device for automobile motors, a shaft and means for driving it by power, both said shaft and said driving means being relatively stationary with respect to the automobile, a pair of plates secured to opposite sides of said shaft, at one end thereof, and adapted to straddle the angle of the crank, and a bar secured at one end between said plates and shaped for contact with said angle to prevent lateral movement of the shaft in one direction, and means to prevent such movement in the other direction, the aforesaid bar extending laterally and being adapted to engage an off-center part of the crank.

2. In a motor-spinning device for automobile motors, a shaft and means for driving it by power, both said shaft and said driving means being relatively stationary with respect to the automobile, a pair of plates secured to opposite sides of said shaft, at one end thereof, and adapted to straddle the angle of the crank, and a bar secured at one end between said plates and shaped for contact with said angle to prevent lateral movement of the shaft in one direction, and means to prevent such movement in the other direction, the aforesaid bar extending laterally and being forked to receive an off-center part of the crank.

In testimony whereof I have hereunto set my hand.

WALTER BERTON SMITH.